US008725916B2

(12) United States Patent
Bhesania et al.

(10) Patent No.: US 8,725,916 B2
(45) Date of Patent: May 13, 2014

(54) HOST SIDE IMPLEMENTATION FOR HID I²C DATA BUS

(75) Inventors: Firdosh K. Bhesania, Kirkland, WA (US); Arvind R. Aiyar, Kirkland, WA (US); Di Da, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/345,690

(22) Filed: Jan. 7, 2012

(65) Prior Publication Data

US 2013/0179609 A1    Jul. 11, 2013

(51) Int. Cl.
G06F 13/12    (2006.01)
G06F 13/38    (2006.01)

(52) U.S. Cl.
USPC .......................................................... 710/62

(58) Field of Classification Search
USPC .......................................................... 710/62
See application file for complete search history.

(56) References Cited

U.S. PATENT DOCUMENTS

| | | | |
|---|---|---|---|
| 5,892,933 A | 4/1999 | Voltz | |
| 6,263,392 B1 | 7/2001 | McCauley | |
| 6,311,228 B1 | 10/2001 | Ray | |
| 6,363,437 B1* | 3/2002 | Ptasinski et al. | 710/10 |
| 6,678,830 B1* | 1/2004 | Mustafa et al. | 713/310 |
| 6,813,650 B1* | 11/2004 | Cato et al. | 710/14 |
| 7,047,343 B2 | 5/2006 | Shaw | |
| 7,660,611 B1 | 2/2010 | Asbury et al. | |
| 8,521,942 B2 | 8/2013 | Bhesania et al. | |
| 2002/0167932 A1 | 11/2002 | McGowan | |
| 2003/0054880 A1 | 3/2003 | Lam et al. | |
| 2003/0188100 A1* | 10/2003 | Solomon et al. | 711/114 |
| 2004/0203363 A1* | 10/2004 | Carlton et al. | 455/41.2 |
| 2004/0225902 A1* | 11/2004 | Cesare et al. | 713/300 |
| 2005/0182612 A1* | 8/2005 | Anderson et al. | 703/18 |
| 2005/0229000 A1* | 10/2005 | Shoji et al. | 713/182 |

(Continued)

FOREIGN PATENT DOCUMENTS

JP    2004-528627 A    9/2004
KR    20050065649    6/2005

(Continued)

OTHER PUBLICATIONS

"Documentation I2C Writing-Clients", *Linux Kernel Documentation, Based on Kernel Version 3.1*, retrieved from <http://www.mjmwired.net/kernel/Documentation/i2c/writing-clients> on Dec. 20, 2011,(Nov. 2, 2011), 7 pages.

(Continued)

*Primary Examiner* — Farley Abad
(74) *Attorney, Agent, or Firm* — Aaron Chatterjee; Andrew Sanders; Micky Minhas

(57) ABSTRACT

In embodiments of host side implementation for HID I²C data bus, a computing system includes a human interface device (HID) software stack that implements device software, such as for embedded devices, that interfaces the computing system to a peripheral device via HID over I²C. An HID I²C driver interfaces the HID software stack with the peripheral devices that each include an HID I²C interface to a device that communicates data in the computing system via an I²C data bus. The HID I²C driver is compatible and interfaces with I²C controller drivers and GPIO controller drivers of the devices, where the I²C controller drivers and the GPIO controller drivers may each have a different implementation configuration.

20 Claims, 5 Drawing Sheets

(56) References Cited

U.S. PATENT DOCUMENTS

| | | | |
|---|---|---|---|
| 2006/0094461 | A1 | 5/2006 | Hameed et al. |
| 2007/0150560 | A1 | 6/2007 | Zhang et al. |
| 2009/0027972 | A1* | 1/2009 | Bode ................ 365/185.23 |
| 2009/0054069 | A1 | 2/2009 | Calnan, III et al. |
| 2009/0077283 | A1 | 3/2009 | Grushkevich |
| 2009/0249202 | A1 | 10/2009 | Bonnat |
| 2010/0042763 | A1 | 2/2010 | Bica |
| 2010/0180067 | A1 | 7/2010 | Garcia et al. |
| 2010/0185787 | A1 | 7/2010 | Krantz et al. |
| 2010/0262929 | A1 | 10/2010 | Avery |
| 2012/0246377 | A1 | 9/2012 | Bhesania et al. |
| 2013/0332643 | A1 | 12/2013 | Bhesania |

FOREIGN PATENT DOCUMENTS

| | | |
|---|---|---|
| KR | 10-2006-0082653 A | 7/2006 |
| KR | 10-2007-0020998 A | 2/2007 |
| WO | WO-2012128977 | 9/2012 |

OTHER PUBLICATIONS

"Human Interface Device Tutorial", *Silicon Labs, AN249*, retrieved from <http://www.silabs.com/Support%20Documents/TechnicalDocs/AN249.pdf> on Dec. 19, 2011,(Mar. 2011), 52 pages.

"Interface Manual USB HID—I2C", *Coptonix, Berlin, Germany; Rev 1.04*, retrieved from <http://www.coptonix.com/files/USBIICMSHD.pdf> on Dec. 19, 2011,(Oct. 2011), 24 pages.

"USB I2C Driver Free USB to Synchronous Serial I2C Slave Interface", *Firmware Factory*, retrieved from <http://www.firmwarefactory.com/Docs/USB-I2C%20HW145.pdf> on Dec. 19, 2011,(Aug. 26, 2010), 9 pages.

"International Search Report", Mailed Date: Apr. 25, 2013, Application No. PCT/US2013/020501, Filed date: Jan. 7, 2013, pp. 9.

"AVR328: USB Generic HID Implementation", *Atmel Corporation*, Available at <http://www.atmel.com/dyn/resources/prod_documents/doc7599.pdf>,(2008), pp. 1-13.

"Bridge over Troubled Water: Using USB Connectivity to Integrate Touch Screens in Computing Applications", *Silicon Laboratories, Inc.*, Available at <http://pandatron.cz/ostatni/docufirm/49605.pdf>, (Nov. 3, 2010), pp. 1-7.

"Digital Accelerometer ADXL345", *Analog Devices*, Available at <http://www.sparkfun.com/datasheets/Sensors/Accelerometer/ADXL345.pdf>, (May 2009), 24 pages.

"Final Office Action", U.S. Appl. No. 13/053,104, (Mar. 20, 2013), 5 pages.

"HID Information", Retrieved from: <http://www.usb.org/developers/hidpage/>on Jan. 31, 2011, 3 pages.

"Non-Final Office Action", U.S. Appl. No. 13/053,104, (Feb. 12, 2013), 8 pages.

"Non-Final Office Action", U.S. Appl. No. 13/966,100, (Sep. 26, 2013), 6 pages.

"Notice of Allowance", U.S. Appl. No. 13/053,104, (Apr. 16, 2013), 5 pages.

"PCT Search Report and Written", Application No. PCT/US2012/028666, (Oct. 12, 2012), 9 pages.

"USB human interface device class", Retrieved from: <http://en.wikipedia.org/wiki/USB_human_interface_device_class>on Jan. 31, 2011, (Jan. 3, 2011), 5 pages.

Allman, Stuart "Using the HID class eases the job of writing USB device drivers", *EDN*, Available at <http://leyenda2.demon.co.uk/mike/projects/USB/HIDProgramming.pdf>, (Sep. 19, 2002), 5 pages.

Steiner, Hans-Christoph et al., "A Unified Toolkit for Accessing Human Interface Device in Pure Data and Max/MSP", In *Proceedings of NIME 2007*, Available at <http://alumni.media.mitedu/~dmerrill/publications/dmerrill_NIME07-HID.pdf>,(Jun. 2007), 4 pages.

"Final Office Action", U.S. Appl. No. 13/966,100, (Nov. 22, 2013), 6 pages.

"Notice of Allowance", U.S. Appl. No. 13/966,100, Jan. 9, 2014, 4 pages.

Panich, "Data Communication in Mobile Robot Application with I2C Bus", In Proceedings: Journal of Computer Science 6 (3): 296-301, 2010, 2010, pp. 296-301.

Portilla, et al.,' "Integrated hardware interfaces for modular sensor networks", In Proceedings: SPIE 6590, VLSI Circuits and Systems III, 659014, May 10, 2007, 9 pages.

\* cited by examiner

HOST SIDE IMPLEMENTATION FOR HID I²C DATA BUS

BACKGROUND

Consumer devices, such as cell phones, media players, and tablet computers, typically enable a platform for devices that are internally connected over a simple peripheral bus (SPB), such as an inter-integrated circuit (I²C two-wire interface bus) and/or a serial peripheral interface (SPI) bus. However, these simple peripheral buses do not have defined standards for running internal, external, and/or embedded devices, such as a touch-screen display, keyboard, mouse input device, sensors, accelerometer, and other human interface device (HID) class of devices. Manufacturers of these devices generally provide proprietary drivers for the devices because there is not a standard protocol for these class devices to communicate over a simple peripheral bus. A consumer system may include internally connected devices from several different third-party manufacturers and hardware vendors, and the corresponding drivers have different interfaces that may pose system integration challenges, introduce system quality deficiencies and stability concerns, and/or limit the ability to perform unified system driver updates and driver validations. A consumer system may include multiple different proprietary vendor drivers, many of which will be kernel drivers, that would typically have to pass logo and validation with system-on-a-chip (SoC) I²C chip drivers.

SUMMARY

This Summary introduces simplified concepts of host side implementation for HID I²C data bus, and the concepts are further described below in the Detailed Description and/or shown in the Figures. This Summary should not be considered to describe essential features of the claimed subject matter, nor used to determine or limit the scope of the claimed subject matter.

Embodiments of host side implementation for HID I²C data bus are described. In embodiments, a computing system includes a human interface device (HID) software stack that implements device software, such as for embedded devices, that interfaces the computing system to a peripheral device via HID over I²C. An HID I²C driver interfaces the HID software stack with the peripheral devices that each include an HID I²C interface to a device that communicates data in the computing system via an I²C data bus. The HID I²C driver is compatible and interfaces with I²C controller drivers and optionally GPIO controller drivers of the devices, where the I²C controller drivers and the GPIO controller drivers may each have a different implementation configuration to support differing I²C controller hardware.

In other embodiments, the HID I²C driver reduces kernel mode to user mode transactions for performance and power optimizations in an operating system of the computing system. The HID I²C driver can be implemented for fast-read transactions, as the HID I²C driver performs an implicit data read of an address on an I²C device without a preceding I²C write transaction to the device. The HID I²C driver is also implemented for single-transaction data reads, as the HID I²C driver implicitly data reads from the same address on the I²C data bus for each data read without a preceding data write for each transaction.

In other embodiments, the HID I²C driver implements passive interrupt processing, as the HID I²C driver reads device data when initiated by an interrupt and offloads the interrupt processing in software to quickly de-prioritize the interrupt. This allows the operating system to continue processing high priority requests from other devices without being delayed by this specific device. The HID I²C driver also implements passive interrupt acknowledgement, as the HID I²C driver reads device data when initiated by an interrupt, the data read implicitly acknowledges the device interrupt. The HID I²C driver can also initiate idling a device into a low power state when the computing system goes into a lower power state, and/or when device firmware does not detect activity at the device level. Additionally, the HID I²C driver is implemented to utilize a shared or singular input connection for interrupts and device wake events for pin count optimization. The HID I²C driver also implements smart error handling and error correction of error conditions detected on the I²C data bus.

BRIEF DESCRIPTION OF THE DRAWINGS

Embodiments of host side implementation for HID I²C data bus are described with reference to the following Figures. The same numbers may be used throughout to reference like features and components that are shown in the Figures.

DETAILED DESCRIPTION

Embodiments of host side implementation for HID I²C data bus are described, which provides a standardized HID over I²C specification. An HID I²C driver implements the HID over I²C specification and connects the simple peripheral bus (SPB) class extension with the human interface device (HID) software stack in a computing system. The HID I²C driver is a class driver that interfaces between the existing HID stack and the I²C stack. The host side of a computing system includes the HID I²C driver and the HID software stack that correlates to the HID I²C driver implemented in an operating system platform of a computing device. The HID I²C driver can run on any host that exposes an I²C transport and a general purpose input/output (GPIO) transport in compliance with an operating system SPB specification (unlike on conventional platforms where a driver would need to be developed on a per-platform basis). Without an SPB standardization, an HID I²C class driver can still be developed, but it would need to be customized for each I²C implementation.

In embodiments, the HID I²C driver is adaptable and can be implemented with multiple, different I²C controller drivers from various vendors. The HID I²C driver also maintains software compatibility with existing HID applications for devices that are interfaced with the computing system. The HID I²C driver also implements power, performance, and pin count optimizations of the HID I²C driver for efficiency in the operating system of the computing system.

While features and concepts of host side implementation for HID I²C data bus can be implemented in any number of different devices, systems, environments, and/or configurations, embodiments of host side implementation for HID I²C data bus are described in the context of the following example devices, systems, and methods.

Figure 1:
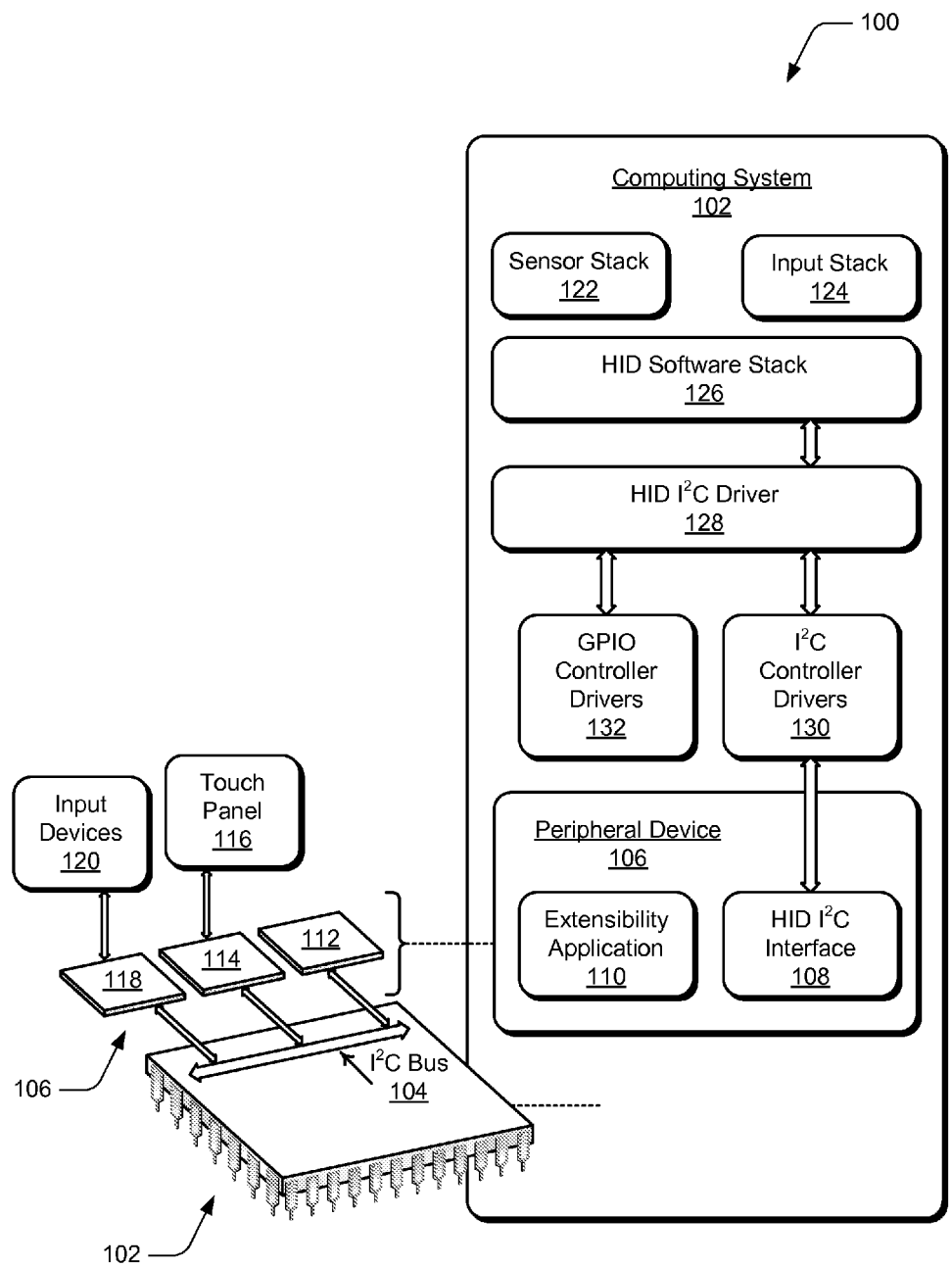
FIG. 1 illustrates an example system in which embodiments of host side implementation for HID I²C data bus can be implemented.

FIG. 1 illustrates an example system 100 in which embodiments of host side implementation for HID I²C data bus can be implemented. The system includes a computing system 102 that can be implemented in any type of computing device, such as a computer, server, communication device, portable device, tablet computer, mobile phone, navigation device, media player, gaming device, and the like. In embodiments, the computing system may implemented as a system-on-chip (SoC) as described with reference to the example SoC system shown in FIG. 3, implemented in an X86-type PC, or as any other type of computing system design. A computing device that includes the computing system 102 can be implemented with various components, such as a processor and/or memory devices system, as well as any number and combination of differing components as further described with reference to the example device shown in FIG. 5. Further, the computing system can be implemented with additional components as further described with reference to the example SoC system shown in FIG. 3.

The computing system 102 is also illustrated as a computer chip that includes an I²C data bus 104 and peripheral devices, represented by a peripheral device 106 that implements an HID I²C interface 108 along with an extensibility application 110. The HID I²C interface can interface sensors, embedded devices, internal and/or external devices (e.g., human interface devices (HID)), and/or other integrated components with the computing system. The HID I²C interface 108 and the extensibility application 110 of a peripheral device 106 can be implemented as computer-executable instructions, such as in firmware. Alternatively or in addition, the HID I²C interface may be implemented in hardware. The extensibility application 110 of a peripheral device can be implemented to interface extensibility data for proprietary functions and/or features of the device with the computing system 102 via the I²C data bus 104.

The HID I²C interface 108 establishes peripheral device operability standards. A third-party, independent hardware vendor, can interface an internal, external, or embedded device via the HID I²C interface 108 of a peripheral device 106, yet also differentiate and implement proprietary functions and/or features via the extensibility application 110 of the peripheral device. The HID I²C interface 108 of a peripheral device 106 is also implemented to indicate (e.g., identify, expose, translate, enumerate, etc.) that an internal, external, and/or embedded device or sensor is an HID compatible device to the computing system 102. The peripheral device 106 can also determine a configuration of the device and/or sensor (e.g., from data structures, report descriptors, etc.), receive configuration data from the computing system 102 to configure a device or sensor, and/or communicate configuration data from the computing system to the device or sensor.

Examples of the peripheral device 106 include a peripheral device 112 that can be implemented as a sensor, such as a temperature, accelerometer, gyroscope, compass, or other type of a sensor. The HID I²C interface 108 of the peripheral device 112 interfaces the peripheral device with the computing system 102 via the I²C data bus 104. In other implementations, the HID I²C interface 108 of a peripheral device can be implemented to interface the peripheral device with the computing system 102 via the I²C data bus 104 in an HID data format, and data is communicated as HID data structures via the I²C data bus. Other examples of the peripheral device 106 include a peripheral device 114 that interfaces a touch-panel 116, such as a tablet computer touch-screen display device, with the computing system via the I²C data bus. In another example, a peripheral device 118 interfaces computer input devices 120, such as a keyboard or mouse input device, with the computing system via the I²C data bus.

The peripheral device 118 may also interface a sensor or other integrated device (e.g., an internal, external, or embedded device) with the computing system 102 via the I²C data bus. For example, the peripheral device 118 can be implemented to bridge a sensor or device output over an I²C interface in the form of HID data. A device manufacturer can implement a device (e.g., touch-panel, input devices, embedded devices, sensors, etc.) to expose its functionality through HID. For example, a touch-screen controller can be implemented to read raw touch sensor data, which may be analog sensors, and generate digital signals that are communicated to the CPU of the computing system. These types of controllers can be updated to expose the touch data to the CPU through an HID protocol.

In this example, a software stack in the computing system 102 includes a sensor stack 122, an input stack 124, and an HID software stack 126. The computing system also includes an HID I²C driver 128 that implements embodiments of host side implementation for HID I²C data bus, as well as interfaces with I²C controller drivers 130 and general purpose input/output (GPIO) controller drivers 132. In implementations, each of the examples of the peripheral device 106 (e.g., peripheral devices 112, 114, and 118) includes the HID I²C interface 108, and the HID I²C driver that correlates to the I²C controller is implemented to communicate HID data between a peripheral device and the HID software stack.

In embodiments, the HID I²C driver 128 maintains software compatibility with device applications in the HID software stack 126. The HID I²C driver 128 interfaces the HID software stack 126 with the peripheral devices (e.g., peripheral device 106) that each include the HID I²C interface 108 to a device that communicates data in the computing system via the I²C data bus 104. The HID I²C driver also interfaces the HID software stack 126 with the I²C controller drivers 130 and the GPIO controller drivers 132 of the devices. The HID I²C driver is also implemented for compatibility with the I²C controller drivers 130 that may each have a different implementation configuration to support differing I²C controller hardware, such as controller drivers from different vendors. The HID I²C driver 128 is adaptable to multiple different proprietary, third-party controllers, and in implementations, may be adapted via an API input or include a programmable registry.

In embodiments, the HID I²C driver 128 is implemented to reduce kernel mode to user mode transactions for kernel mode power optimizations that already exist in the kernel mode of the operating system. The HID I²C driver is also implemented for fast-read transactions, as the HID I²C driver performs an implicit data read of an address on an I²C device without a preceding I²C write transaction to the I²C device. For example, rather than a conventional data write and then data read transaction on the data bus, the HID I²C driver can initiate a single input data read transaction to optimize data bus performance. The data read is implicit from a data write for a register address on the data bus for a fast-read transaction, also referred to as a "writeless-read" transaction. The register address can be implicit and the device firmware defaults to the input register, as the most common host-to-device operation. The device firmware can support moving its running "register address pointer" back to the Input Register after any transaction that uses an explicit register address.

The HID I²C driver 128 is also implemented for single-transaction data reads, as the HID I²C driver implicitly data reads from the same address on the I²C data bus for each data read without a preceding data write for each transaction. An SPB multi-transfer sequence combines the data writes and the data reads into a single transaction.

In embodiments, the HID I²C driver 128 is also implemented for passive interrupt processing, as the HID I²C driver reads device data when initiated by an interrupt and offloads the interrupt processing in software to quickly de-prioritize the interrupt. In an implementation, the HID I²C driver can utilize workitems as the mechanism to deliver input reports to the upper driver stack (e.g., the HID software stack 126). This offloads work from the interrupt service routine (ISR) and allows a lower priority workitem or service provider to complete interrupt requests. The HID I²C driver 128 is also configured for passive interrupt acknowledgement, as the HID I²C driver reads device data when initiated by an interrupt, the data read implicitly acknowledges the device interrupt. The HID I²C driver supports passive GPIO interrupts, and can use simple peripheral bus (SPB) input/output to acknowledge interrupt processing.

In embodiments, the HID I²C driver 128 is implemented for power optimizations, and can initiate idling a device into a low power state when the computing system 102 goes into a lower power state, or when device firmware does not detect activity at the device level. The HID I²C driver 128 is also implemented for pin count optimization, and can utilize a shared or singular input connection for interrupts and device wake events. For example, the HID I²C driver can use a GPIO as a shared and wakeable interrupt mechanism. The HID I²C driver supports wakeable interrupt lines and can utilize a pre-process routine that synchronizes a device wake event with an idle transition.

In embodiments, the HID I²C driver 128 is also implemented for error handling and error correction of error conditions detected on the I²C data bus. The HID I²C driver attempts to identify and automatically correct error conditions on the I²C data bus without impacting end user usability. For example, the host side of the computing system (e.g., interfaced by the HID I²C driver) may receive an unexpected NAK (negative acknowledgement) from a device, such as an embedded device or sensor that interfaces to the computing system via a peripheral device 106. The HID I²C driver 128 is implemented to either automatically retry sending the data to the device, or discard the transaction and on to the next transaction. Alternatively or in addition, the device may be hung and only partially responsive, and after the default timer elapses, the host side software cancels the data transaction to the device and continues with the next transaction. This allows a user to continue using the device despite a potential loss of input, such as a missed keystroke or mouse input movement. Alternatively or in addition, the device may be hung and non-responsive, in which case the host software identifies the error condition and initiates a reset of the device in an effort to restore a functional state of the device without an indication to the user of the error condition and without user perceivable impact.

Figure 2:
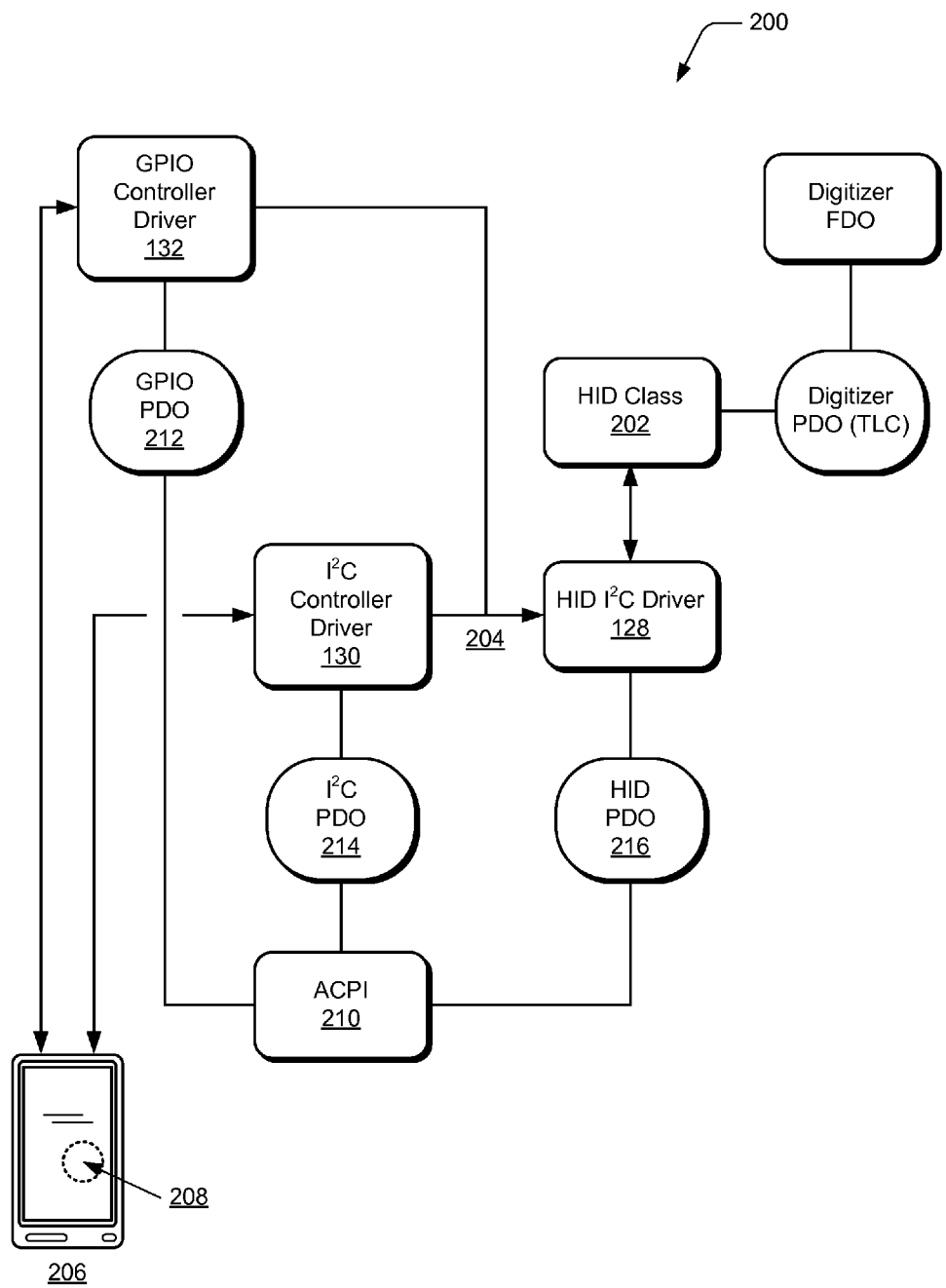
FIG. 2 further illustrates the example system in an implementation in which embodiments of host side implementation for HID I²C data bus can be implemented.

FIG. 2 further illustrates components and device's software of the example system shown in FIG. 1 in an implementation 200, which includes the HID I²C driver 128 that interfaces and communicates with the I²C controller driver 130 and the GPIO controller driver 132. Although only one I²C controller driver and one GPIO controller driver are shown, the HID I²C driver can be implemented to interface with multiple I²C controller drivers and/or GPIO controller drivers.

The HID I²C driver 128 is also implemented to interface and communicate with computing system applications and software stack, such as an HID class 202. For example, the HID I²C driver 128 can receive an interrupt 204 from the I²C controller driver 130 and/or from the GPIO controller driver 132 when a device 206 detects a touch contact input 208 on a touch screen of the device. The HID I²C driver 128 can then communicate the interrupt to the system application and software stack, such as for digitizer software that processes the touch contact input.

The HID I²C driver 128 is also implemented to interface and communicate with an advanced configuration and power interface (ACPI) 210 that monitors the power state of the devices. The ACPI interfaces with a GPIO physical device object (PDO) 212, an I²C PDO 214, and a HID PDO 216 to first enumerate these devices and then monitor the power states of the devices.

Figure 3:
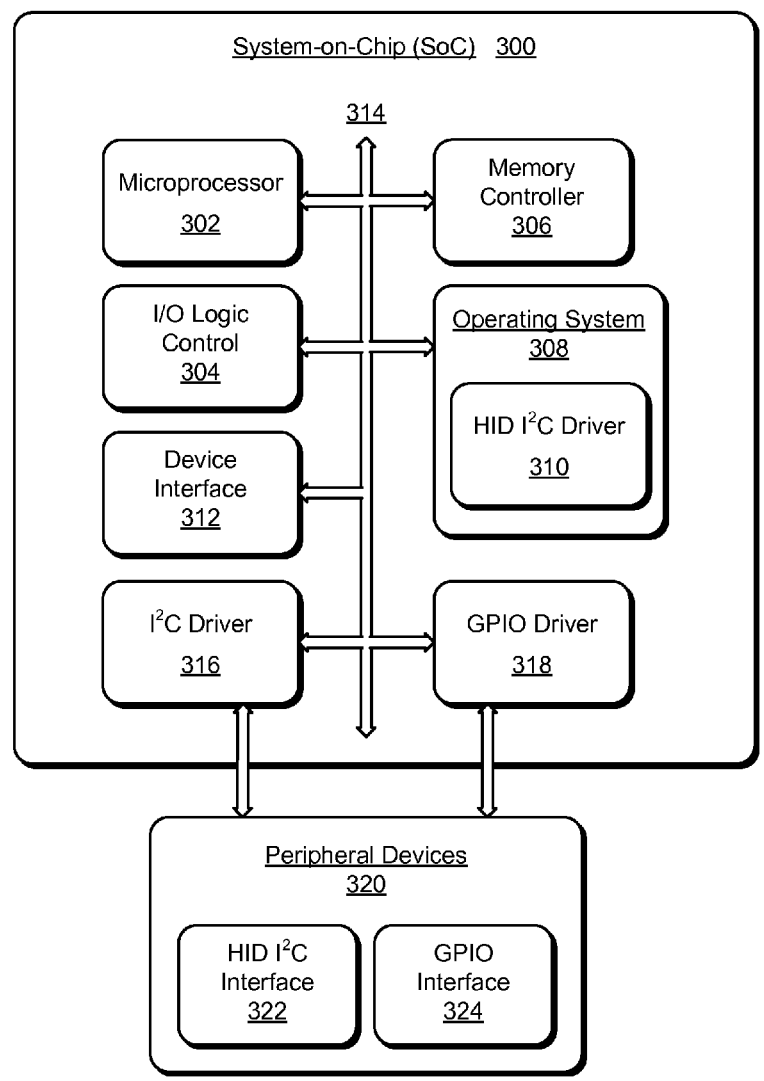
FIG. 3 illustrates an example system-on-chip (SoC) in which embodiments of host side implementation for HID I²C data bus can be implemented.

FIG. 3 illustrates an example system-on-chip (SoC) 300, which can implement various embodiments of host side implementation for HID I²C data bus as described herein. The SoC 300 may be implemented in a fixed or mobile device, such as any one or combination of a consumer, electronic, communication, navigation, media, computing device, and/or other type of electronic device. The SoC 300 can be integrated with electronic circuitry, a microprocessor, memory, input-output (I/O) logic control, communication interfaces and components, as well as other hardware, firmware, and/or software to implement a computing device.

In this example, the SoC 300 is integrated with a microprocessor 302 (e.g., any of a microcontroller or digital signal processor) and input-output (I/O) logic control 304 (e.g., to include electronic circuitry). The SoC also includes a memory controller 306 (to include memory, such as any type of a nonvolatile memory and/or other suitable electronic data storage). The SoC can also include various firmware and/or software, such as an operating system 308 that is maintained by memory and executed by the microprocessor. The operating system includes an HID I²C driver 310, such as described with reference to FIGS. 1 and 2, that implements embodiments of host side implementation for HID I²C data bus as described herein.

The SoC 300 includes a device interface 312 to interface with a device, sensor, embedded device, or other integrated component, such as when installed in a computing device. The SoC 300 also includes an integrated data bus 314 that couples the various components of the SoC for data communication between the components. In this example, the data bus in the SoC can be implemented as an I²C data bus, other type of simple peripheral bus (SPB), or a serial peripheral interface (SPI) data bus, and may also be implemented as any one or a combination of different bus structures and/or bus architectures.

The SoC 300 also includes an I²C driver 316 and/or a GPIO driver 318 that interfaces one or more peripheral devices 320, such as described with reference to the various examples of peripheral devices (e.g., peripheral device 106) shown in FIG. 1. The driver software associated with the I²C driver 316 and the GPIO driver 318 is embodied in the operating system 308. A peripheral device 320 implements an HID I²C interface 322 and/or a GPIO interface 324. Examples of the HID I²C interface and GPIO interface, as well as corresponding functionality and features, are described with reference to the respective components shown in FIGS. 1 and 2. Alternatively or in addition, components of the peripheral devices can be implemented as hardware, firmware, fixed logic circuitry, or any combination thereof that is implemented in connection with the I/O logic control 304 and/or other processing and control circuits of the SoC or peripheral devices.

Example method 400 is described with reference to FIG. 4 in accordance with one or more embodiments of host side implementation for HID I²C data bus. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
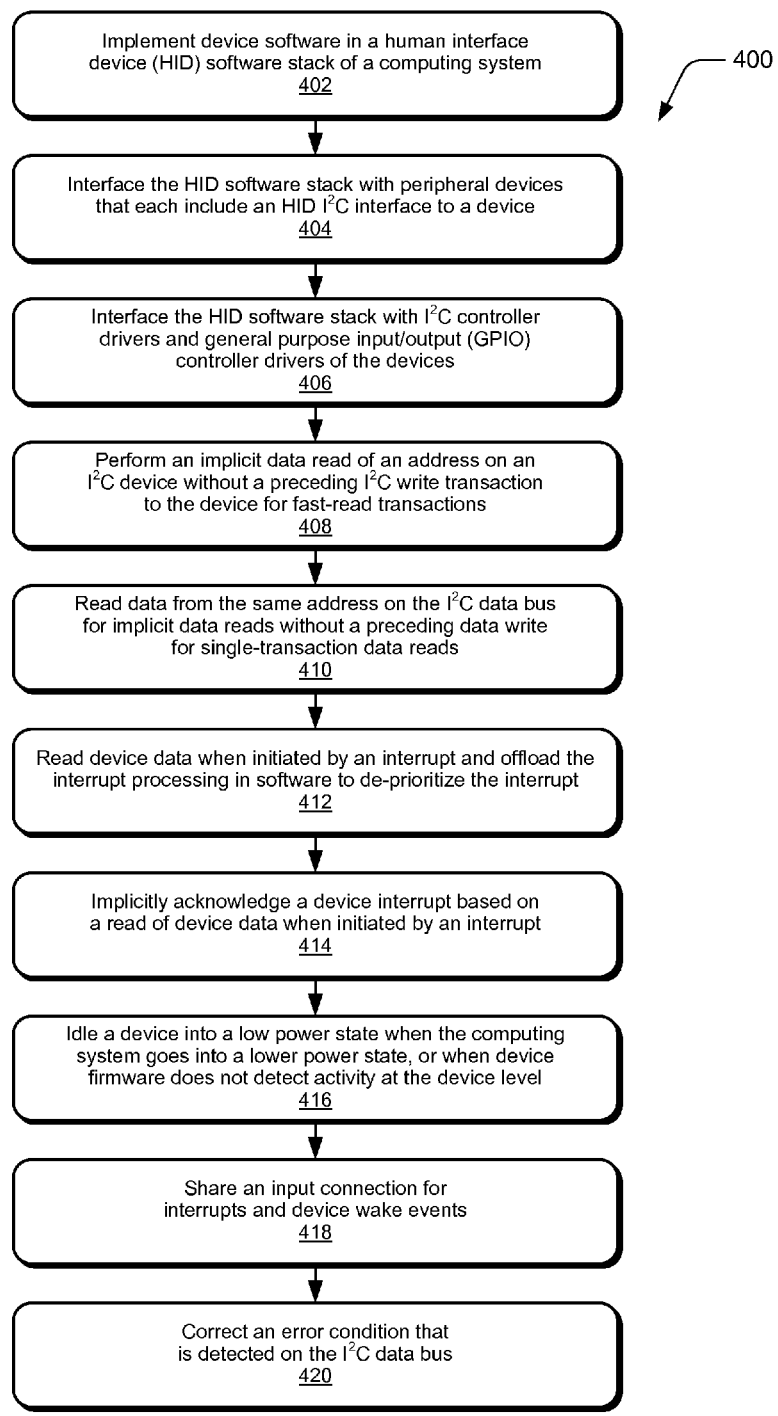
FIG. 4 illustrates example method(s) of host side implementation for HID I²C data bus in accordance with one or more embodiments.

FIG. 4 illustrates example method(s) 400 of host side implementation for HID I²C data bus, and is described with reference to an HID I²C driver. The order in which the method blocks are described are not intended to be construed as a limitation, and any number of the described method blocks can be combined in any order to implement a method, or an alternate method.

At block 402, device software is implemented in a human interface device (HID) software stack of a computing system. For example, the HID software stack 126 in the host side of the computing system 102 (FIG. 1) implements device software, such as for internal, external, and/or embedded devices or sensors that interface with the computing system via the HID I²C driver 128 and a corresponding peripheral device 106 via the I²C data bus 104.

At block 404, the HID software stack is interfaced with peripheral devices that each include an HID I²C interface to a device. For example, the HID I²C driver 128 in the host side of the computing system 102 interfaces the HID software stack 126 with the peripheral devices (e.g., peripheral device 106) that each include an HID I²C interface 108 to a device 106 (e.g., an embedded device or other integrated component). The devices may be internal, external, or embedded devices and/or sensors that are implemented for data communication in the computing system 102 via the I²C data bus 104.

At block 406, the HID software stack is interfaced with I²C controller drivers and general purpose input/output (GPIO) controller drivers of the devices. For example, the HID I²C driver 128 in the host side of the computing system 102 also interfaces the HID software stack 126 with the I²C controller drivers 130 and the general purpose input/output (GPIO) controller drivers 132 of the devices.

At block 408, an implicit data read of an address on an I²C device is performed without a preceding I²C write transaction to the device for fast-read transactions. For example, the HID I²C driver 128 in the host side of the computing system 102 performs fast-read transactions as an implicit data read of an address on an I²C device without a preceding I²C write transaction to the device. At block 410, data is read from the same address on the I²C data bus for implicit data reads without a preceding data write for single-transaction data reads. For example, the HID I²C driver 128 of the computing system 102 initiates single-transaction data reads as data is read from the same address on the I²C data bus 104 for implicit data reads without a preceding data write.

At block 412, device data is read when initiated by an interrupt and the interrupt processing is offloaded in software to de-prioritize the interrupt. For example, the HID I²C driver 128 in the host side of the computing system 102 reads device data when initiated by an interrupt and the interrupt processing is offloaded in software to quickly de-prioritize the interrupt. At block 414, a device interrupt is implicitly acknowledged based on a read of device data when initiated by an interrupt. For example, the HID I²C driver 128 in the host side of the computing system 102 implicitly acknowledges a device interrupt based on a read of device data when initiated by an interrupt.

At block 416, a device is idled into a low power state when the computing system goes into a lower power state, or when device firmware does not detect activity at the device level. For example, the HID I²C driver 128 in the host side of the computing system 102 idles a device (e.g., an embedded device or sensor that interfaces to the computing system 102) into a low power state when the computing system 102 goes into a lower power state, or when device firmware does not detect activity at the device level.

At block 418, an input connection is shared for interrupts and device wake events. For example, the HID I²C driver 128 in the host side of the computing system 102 shares a GPIO input connection for interrupts and device wake events. At block 420, an error condition that is detected on the I²C data bus is corrected. For example, the HID I²C driver 128 of the computing system 102 corrects error conditions at the HID I²C protocol level that are detected on the I²C data bus 104. As noted above, any of the described method blocks can be combined in any order to implement a method, or an alternate method. Accordingly, detection and correction of an error condition on the I²C data bus at block 420 may occur before, during, or after any of the other described method blocks 402-418.

Figure 5:
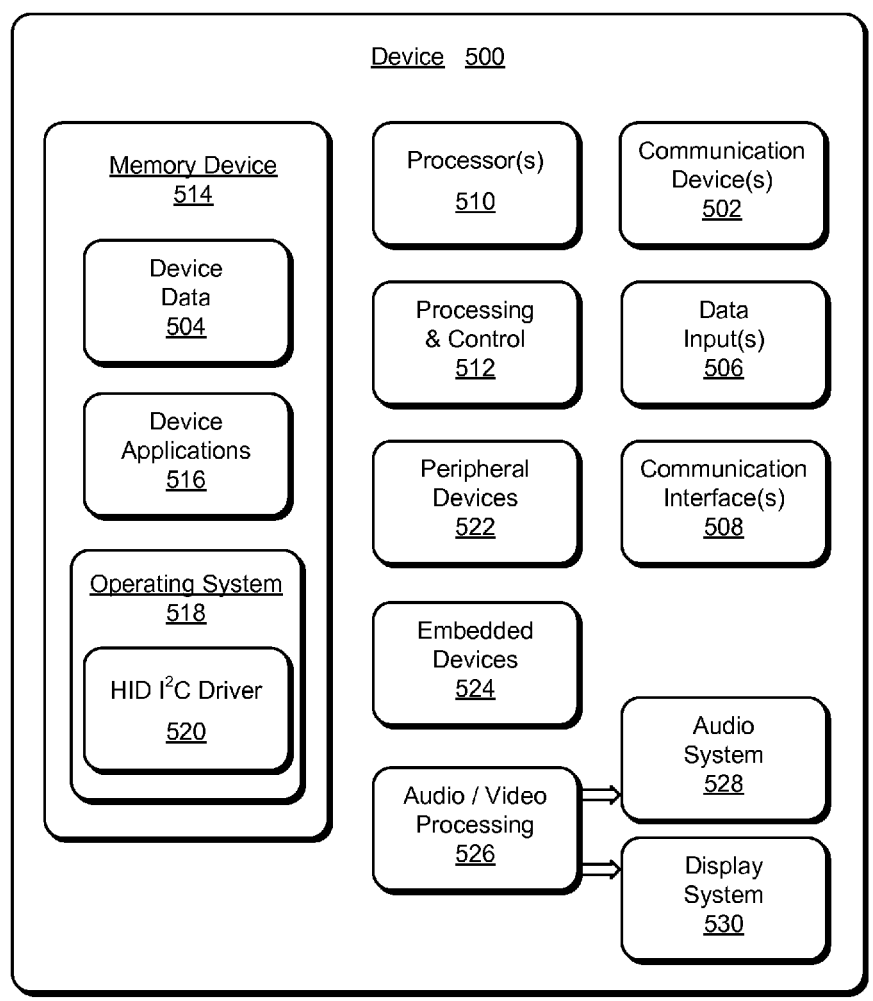
FIG. 5 illustrates various components of an example device that can implement embodiments of host side implementation for HID I²C data bus.

FIG. 5 illustrates various components of an example device 500 that can be implemented as any of the devices, or services and software implemented by devices, described with reference to the previous FIGS. 1-4. In embodiments, the device may be implemented as any one or combination of a fixed or mobile device, in any form of a consumer, computer, server, portable, user, communication, phone, navigation, television, appliance, gaming, media playback, camera, and/or electronic device. The device may also be associated with a user (i.e., a person) and/or an entity that operates the device such that a device describes logical devices that include users, software, firmware, hardware, and/or a combination of devices.

The device 500 includes communication devices 502 that enable wired and/or wireless communication of device data 504. The device data or other device content can include configuration settings of the device, media content stored on the device, and/or information associated with a user of the device. Media content stored on the device can include any type of audio, video, and/or image data. The device includes one or more data inputs 506 via which any type of data, media content, and/or inputs can be received, such as user-selectable inputs and any other type of audio, video, and/or image data received from any content and/or data source.

The device 500 also includes communication interfaces 508, such as any one or more of a serial, parallel, network, or wireless interface. The communication interfaces provide a connection and/or communication links between the device and a communication network by which other electronic, computing, and communication devices communicate data with the device.

The device 500 includes one or more processors 510 (e.g., any of microprocessors, controllers, and the like) or a processor and memory system (e.g., implemented in an SoC), which process computer-executable instructions to control the operation of the device. Alternatively or in addition, the device can be implemented with any one or combination of software, hardware, firmware, or fixed logic circuitry that is implemented in connection with processing and control circuits which are generally identified at 512. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 also includes one or more memory devices 514 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. Computer-readable storage media can be any available medium or media that is accessed by a computing device.

A memory device 514 provides data storage mechanisms to store the device data 504, other types of information and/or data, and device applications 516. For example, an operating system 518 can be maintained as a software application with a memory device and executed on the processors. In this example, an HID I$^2$C driver 520 is implemented in the operating system to implement embodiments of host side implementation for HID I$^2$C data bus as described herein. The device applications may also include a device manager, such as any form of a control application, software application, signal processing and control module, code that is native to a particular device, a hardware abstraction layer for a particular device, and so on. In this example, the device also includes one or more peripheral devices 522 that interface with embedded devices 524.

The device 500 also includes an audio and/or video processing system 526 that generates audio data for an audio system 526 and/or generates display data for a display system 528. The audio system and/or the display system may include any devices that process, display, and/or otherwise render audio, video, display, and/or image data. In implementations, the audio system and/or the display system are external components to the device, or are integrated components of the example device.

Although embodiments of host side implementation for HID I$^2$C data bus have been described in language specific to features and/or methods, the subject of the appended claims is not necessarily limited to the specific features or methods described. Rather, the specific features and methods are disclosed as example implementations of host side implementation for HID I$^2$C data bus.

The invention claimed is:
1. A computing system, comprising:
    a human interface device (HID) software stack configured for device software implementation; and
    an HID I$^2$C driver configured to interface the HID software stack with one or more peripheral devices that each include an HID I$^2$C interface to a device that is configured for data communication in the computing system via an I$^2$C data bus.

2. A computing system as recited in claim 1, wherein the HID I$^2$C driver is configured for compatibility with one or more I$^2$C controller drivers of the devices, the one or more I$^2$C controller drivers each having a different implementation configuration to support differing I$^2$C controller hardware.

3. A computing system as recited in claim 1, wherein the HID I$^2$C driver is configured to reduce kernel mode to user mode transactions for kernel mode power optimization.

4. A computing system as recited in claim 1, wherein the HID I$^2$C driver is configured for fast-read transactions, as the HID I$^2$C driver performs an implicit data read of an address on an I$^2$C device without a preceding I$^2$C write transaction to the I$^2$C device.

5. A computing system as recited in claim 1, wherein the HID I$^2$C driver is configured for single-transaction data reads, as the HID I$^2$C driver implicitly data reads from a same address on the I$^2$C data bus for each data read without a preceding data write for each transaction.

6. A computing system as recited in claim 1, wherein the HID I$^2$C driver is configured for passive interrupt processing, as the HID I$^2$C driver reads device data when initiated by an interrupt and offloads the interrupt processing in software to quickly de-prioritize the interrupt.

7. A computing system as recited in claim 1, wherein the HID I$^2$C driver is configured for passive interrupt acknowledgement, as the HID I$^2$C driver reads device data when initiated by an interrupt, the data read implicitly acknowledges the device interrupt.

8. A computing system as recited in claim 1, wherein the HID FC driver is configured to initiate idling a device into a low power state when one of: the computing system goes into a lower power state, or device firmware does not detect activity at the device level.

9. A computing system as recited in claim 1, wherein the HID I$^2$C driver is configured to utilize a shared or singular input connection for interrupts and device wake events.

10. A computing system as recited in claim 1, wherein the HID I$^2$C driver is configured for error handling and error correction of error conditions detected on the I$^2$C data bus.

11. A computer-implemented method as recited in claim 10, further comprising performing an implicit data read of an address on an I$^2$C device without a preceding I$^2$C write transaction to the device for fast-read transactions.

12. A computer-implemented method as recited in claim 10, further comprising reading data from a same address on the I$^2$C data bus for implicit data reads without a preceding data write for single-transaction data reads.

13. A computer-implemented method as recited in claim 10, further comprising reading device data when initiated by an interrupt and offloading the interrupt processing in software to de-prioritize the interrupt.

14. A computer-implemented method as recited in claim 10, further comprising reading device data when initiated by an interrupt, and the data read implicitly acknowledges the device interrupt.

15. A computer-implemented method as recited in claim 10, further comprising idling a device into a low power state when one of: the computing system goes into a lower power state, or device firmware does not detect activity at the device level.

16. A computer-implemented method as recited in claim 10, further comprising sharing an input connection for interrupts and device wake events.

17. A computer-implemented method as recited in claim 10, further comprising correcting error conditions at the HID I²C protocol level that are detected on the I²C data bus.

18. A computing system as recited in claim 17, wherein the HID I²C driver is implemented in an operating system that executes on the computing system, the HID I²C driver configured for power and performance optimization of the operating system in the computing system.

19. A computer-implemented method, comprising:
implementing device software in a human interface device (HID) software stack of a computing system;
interfacing the HID software stack with one or more peripheral devices that each include an HID I²C interface to a device that is configured for data communication in the computing system via an I²C data bus; and
interfacing the HID software stack with one or more I²C controller drivers and one or more general purpose input/output (GPIO) controller drivers of at least one of the one or more peripheral devices.

20. A computing system, comprising:
a human interface device (HID) software stack configured for device software implementation; and
an HID I²C driver configured to interface the HID software stack with one or more I²C controller drivers and one or more general purpose input/output (GPIO) controller drivers of the devices that are configured for data communication in the computing system via an I²C data bus.

* * * * *